(12) United States Patent
Queveau et al.

(10) Patent No.: US 7,441,825 B2
(45) Date of Patent: Oct. 28, 2008

(54) RETRACTABLE ROOF FOR A VEHICLE COMPRISING A TRANSMITTING MOVEMENT DEVICE

(75) Inventors: Gérard Queveau, Amik Farm (FR); Paul Queveau, Le Logis de la Chironniére (FR); Jean-Marc Guillez, Les Maisons Blanches (FR)

(73) Assignee: Heuliez, Cerizay (FR)

( * ) Notice: Subject to any disclaimer, the term of this patent is extended or adjusted under 35 U.S.C. 154(b) by 133 days.

(21) Appl. No.: 11/313,337

(22) Filed: Dec. 21, 2005

(65) Prior Publication Data

US 2006/0145510 A1 Jul. 6, 2006

(30) Foreign Application Priority Data

Dec. 24, 2004 (FR) .................................. 04 53230

(51) Int. Cl.
*B60J 7/08* (2006.01)

(52) U.S. Cl. .............. 296/107.16; 296/108; 296/107.17

(58) Field of Classification Search ............ 296/107.01, 296/108, 107.08, 107.16, 107.17, 219
See application file for complete search history.

(56) References Cited

U.S. PATENT DOCUMENTS

| | | | | |
|---|---|---|---|---|
| 5,769,483 A | * | 6/1998 | Danzl et al. | 296/107.08 |
| 5,975,620 A | * | 11/1999 | Jambor et al. | 296/108 |
| 6,412,860 B1 | * | 7/2002 | Reinsch | 296/219 |
| 6,561,566 B2 | * | 5/2003 | Dintner et al. | 296/107.09 |
| 6,568,751 B2 | * | 5/2003 | Reinsch | 296/219 |
| 6,793,267 B2 | * | 9/2004 | Hesselhaus | 296/107.12 |
| 7,246,841 B2 | * | 7/2007 | Dilluvio | 296/107.09 |
| 7,255,385 B2 | * | 8/2007 | Queveau et al. | 296/108 |
| 2005/0269832 A1 | * | 12/2005 | Queveau et al. | 296/108 |

FOREIGN PATENT DOCUMENTS

FR    2 845 949 A1    4/2004

* cited by examiner

*Primary Examiner*—D. Glenn Dayoan
*Assistant Examiner*—Greg Blankenship
(74) *Attorney, Agent, or Firm*—Nawrocki, Rooney & Sivertson, P.A.

(57) ABSTRACT

A retractable roof for a vehicle comprising at least one front roof element (4) and one rear roof element (3), these at least two elements being mobile between a covering position in which they cover the passenger compartment of the vehicle and a storage position in which they are folded away in the rear boot of the vehicle, the roof also comprising two pivoting arms (1, 2) mounted such as to pivot around axles of rotation (9, 10) on the rear roof element (3) between a longitudinal position in which they extend between the front end of the rear element (3) and the rear of the windscreen on either side and all along the front roof element (4), and a transverse position in which they overlap each other transversally in relation to the plane of symmetry of the vehicle. It comprises a device (11) for transmitting the movement from the rear roof element (3) to the pivoting arms (1, 2), the said transmission device (11) being arranged such as to enable, in a reversible manner, the movement of the pivoting arms (1, 2) between their longitudinal and transverse positions during the movement of the rear roof element between their covering and storage positions.

8 Claims, 1 Drawing Sheet

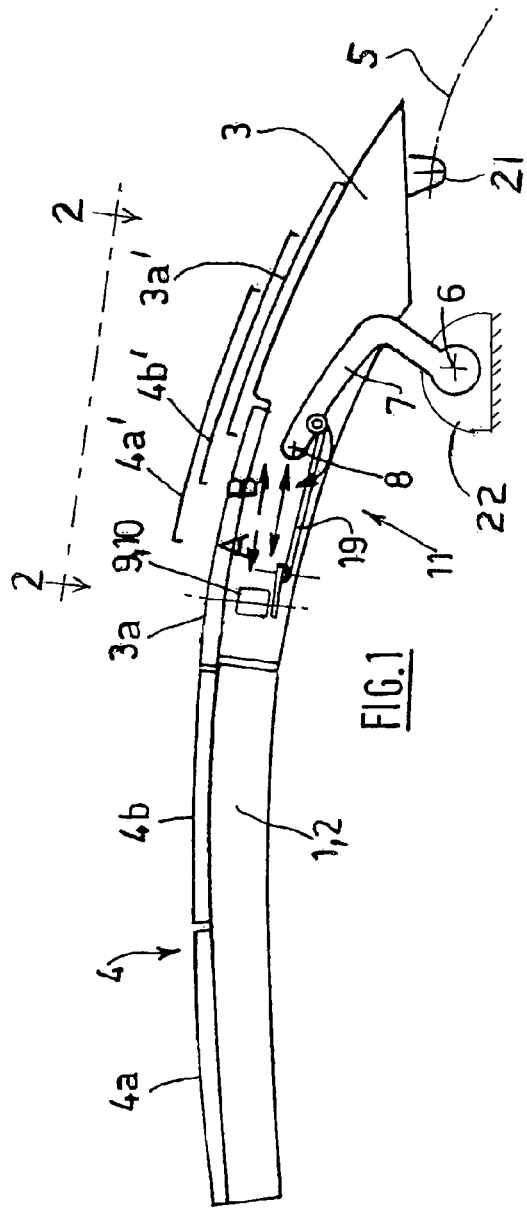
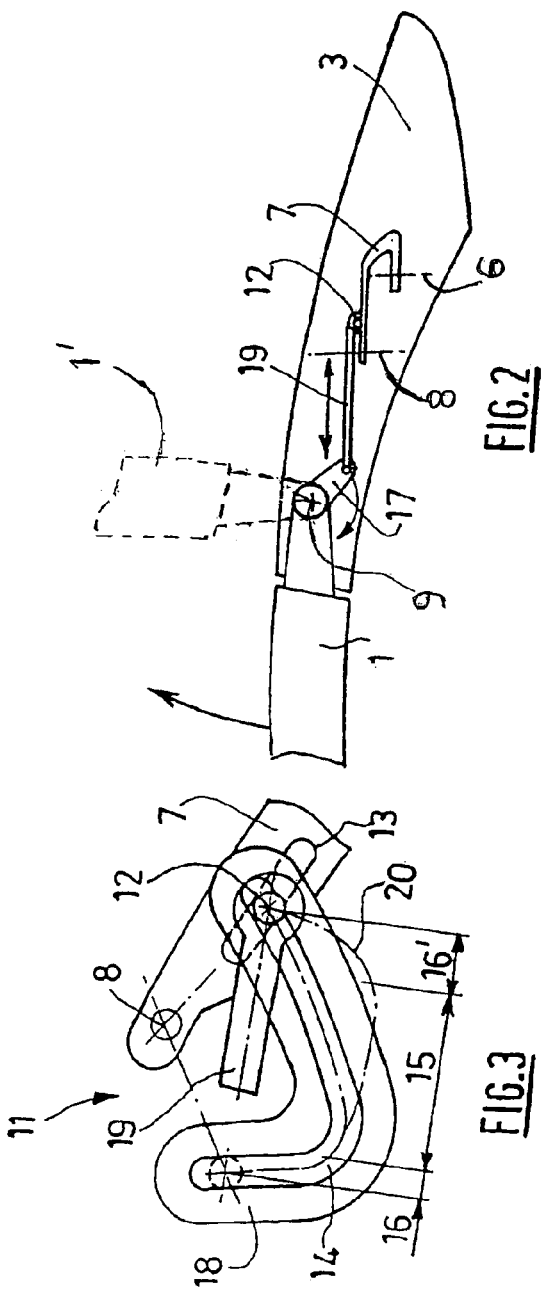
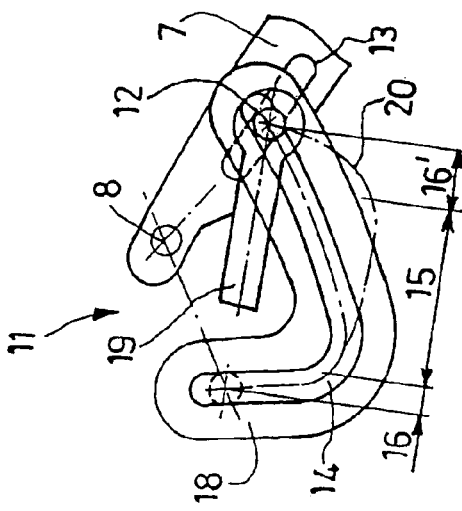

RETRACTABLE ROOF FOR A VEHICLE COMPRISING A TRANSMITTING MOVEMENT DEVICE

BACKGROUND OF THE INVENTION

The invention relates to a retractable roof for a vehicle and a vehicle comprising such a roof. Such a roof makes it possible mainly to transform a coupe or sedan vehicle into a cabriolet vehicle.

SUMMARY OF THE INVENTION

The invention applies more particularly to a retractable roof for a vehicle comprising at least one front roof element, one rear roof element and two arms that pivot around axles of rotation on the rear element of the roof. The front and rear roof elements are mobile between a covering position in which they cover the passenger compartment of the vehicle and a storage position in which they are stored in the rear boot. In their longitudinal position (covering position), the pivoting arms extend between the front end of the rear element and the rear of the windscreen, and when they are in their transverse position (storage position), they overlap transversally in relation to the plane of symmetry of the vehicle.

Document FR-2845949 relates to this type of retractable roof.

The advantage of this type of retractable roof is to limit the stacking height of the roof elements by doing away with the constraint imposed by the height of the lateral areas.

However, this type of roof has the disadvantage of requiring the use of actuators, which are relatively expensive, for controlling the pivoting movement of the arms during a storage or extending movement of the roof.

The invention aims to solve this problem by providing a control that is simple, inexpensive and reliable for the pivoting of the arms during storage or extension of the roof. The control of the pivoting of the arms is simple because it uses the transmission of force from a roof element to pivot the arms.

For this purpose, according to a first aspect, the invention provides a retractable roof for a vehicle comprising at least one front roof element and one rear roof element, these at least two elements being mobile between a covering position in which they cover the passenger compartment of the vehicle and a storage position in which they are folded into the rear boot of the vehicle, the roof also comprising two pivoting arms mounted such as to pivot around axles of rotation on the rear element of the roof between the longitudinal position in which they extend between the front end of the rear element and the rear of the windscreen on either side and along the entire length of the front roof element, and the transverse position in which they overlap each other in relation to a plane of symmetry of the vehicle, characterised in that it comprises a device for the transmission of movement from the rear roof element to the pivoting arms, the said device being arranged such as to enable, in a reversible manner, the movement of the pivoting arms during the movement of the roof between its covering and storage positions.

Thus, the control of the movement of the arms is simple because the movement of the rear roof element is transmitted to the arms and allows them to pivot.

Another advantage that results from the invention is to make it possible to modify the pivoting range of the arms, and thus their speed according to the position of the rear roof element during its movement.

Thus, according to the invention, the transmission device can be adapted such as to limit the pivoting speed of the arms in the areas of the rear roof element in which the movement starts and ends. In fact, in these areas there is a risk of interference between the pivoting arms and an external element (human body, ceiling, etc.) or between the arms and the elements of the vehicle (roof elements, boot, etc.)

BRIEF DESCRIPTION OF THE DRAWINGS

The other characteristics of the invention emerge from the following description of an embodiment of the invention, made in reference to the appended figures, in which:

FIG. 1 is a side view of the roof elements and the device for transmitting the movement from the rear roof element to the pivoting arm;

FIG. 2 is a top view of the transmission device and a lever arm;

FIG. 3 is an enlarged side view of the transmission device.

DETAILED DESCRIPTION OF THE INVENTION

A detailed embodiment of the invention is described below in relation to the figures.

FIG. 1 shows a side view of the elements 1, 2, 3, 4 of the roof and the device 11 for transmission of the movement from the rear roof element 3 to the pivoting arms 1, 2. The vehicle comprises mainly a body 22 shown as symbolically comprising a support for a pivot 6; movable rear roof elements 3, 3a; and at least one front roof element 4 shown as comprising two movable roof elements 4a, 4b. Components 3a', 4a', and 4b' represent components 3a, 4a, and 4b respectively, in transition to a stored position. FIG. 1 shows the FIG. 2 top view as tilted slightly from the horizontal plane of FIG. 1 to be perpendicular to the arm 1 axis of rotation 9.

Although FIG. 1 shows two hard front roof elements 4a, 4b, it is important to note that the invention is applicable regardless of the number and type of front roof elements 4. In fact, these can be hard, soft or made up of small strips. They can be sliding or connected to each other. Moreover, in their storage position, the front roof element or elements 4 can equally be stored above, as shown on the right hand side of FIG. 1, or under the rear roof element 3.

The movement of the rear roof element 3 is controlled, on the one hand, by a guide 5 in the form of a track or channel that extends inside the rear boot, and in which a follower 21 solidly joined to the rear part of the rear element 3 is inserted and on the other hand, by a lever arm 7 connected for rotation to both a fixed pivot 6 on the vehicle body 22 and a fixed pivot 8 on the rear roof element 3.

In the covering position, two pivoting arms 1, 2 extend all along the lateral sides of the front roof element or elements 4 between the front of the rear roof element 3 and the rear of the windscreen of the vehicle.

The arms 1, 2 are mounted to pivot around each axis of rotation 9, 10 situated on the front of the rear roof element 3. In the side view of FIG. 1, axes 9, 10 are in the plane of the paper and slightly tilted from the vertical. FIG. 2 shows axes 9, 10 perpendicular to the plane of the paper. The axes of rotation 9, 10 are not parallel, so the movement of the arms 1, 2 thus takes place in two different planes. Thus, the arms 1, 2 can overlap and bypass each other when they are stored in the transverse position.

FIG. 2 shows when retracting the roof elements 1, 2, 3, 4, how the two arms 1, 2 pivot around their axes of rotation 9, 10 from a longitudinal position at 1 to a transverse position shown in phantom at 1. FIG. 2 shows only arm 1 and axis 9, but the operation of arm 2 as it rotates on axis 10 is very similar.

The following is a detailed description of the device for the transmission of movement 11, referring more specifically to FIGS. 2 and 3.

In the embodiment of the invention described below, the transmission device 11 is made up of two symmetric lateral parts, each of which transmits the movement to a pivoting arm 1, 2. Here, only the operation of one lateral part will therefore be described. In another possible embodiment of the invention, the device 11 for transmitting the movement can be disposed on a single lateral part of the vehicle.

A connecting rod 19 is connected to these two ends.

One end of the connecting rod 19 is connected to a crankpin 12 sliding in a slot 13 of the lever arm 7. The slot 13 of the lever arm 7 is located near its pivot 8 where arm 7 connects with the rear element 3.

The other end of the connecting rod 19 is connected to a control tab 17 that is unitary with arm 1, and is located near the axis of rotation 9. When retracting the roof 3, 4, rotation of arm 7 causes the connecting rod 19 to move in a direction A in relation to the rear roof element 3. Connecting rod 19 pushes the control tab 17, which then rotates around the rotation axis 9 of the arm 1 and thus transmits the movement to the pivoting arm 1.

According to the detailed embodiment of the invention, the crankpin 12 also slides in a slot 14 of a member 18 that is solidly fixed to the rear roof element 3 near pivot 8. The slot 14 of the member 18 on rear roof element 3 has a particular curvature that causes change in the pivoting speed of the arm 1 as a function of the angular position of the rear roof element 3 throughout its movement during storage or extension. Arm 2 operates similarly.

When the roof is in its covering position, the crankpin 12 is located at the rear end of the slot 14 in member 18 as shown in FIG. 3. As already explained, member 18 is solidly joined to the rear roof element 3.

When retracting the roof elements 3, 3a, 4a, 4b, an actuation device, not shown, causes each lever arm 7 to rotate in a clockwise direction around its pivot 8 on the rear roof element 3. This rotation drives the movement of the connecting rod 19 in the direction A relative to the rear roof element 3.

At the start of the retracting movement of the roof, there might be interference with the pivoting arms 1, 2. This can consist of interference with persons occupying the vehicle or with roof elements that have not yet been removed from the arm. In order to reduce the risk of interferences, the device 11 for transmission of movement limits the pivoting range of the arms 1, 2 in this area.

At the start of the retracting movement of the roof elements 3, 3a, 4a, 4b, the rotation movement of the lever arm 7 in relation to its pivot 8 on the rear roof element 3 causes the sliding of the crankpin 12 in a low-pivoting area 16' of the slot 13 in the lever arm 7. The slot 13 thus makes it possible to limit the movement of the connecting rod 19 in the direction A, relative to the rear roof element 3. Thus, the connecting rod 19 transmits a low range of movement to the control tab 17 of the pivoting arm 1. The movement of the pivoting arms 1, 2 is therefore limited or zero, so that the arms 1, 2 begin to pivot toward the transverse, stored position only when roof element 3 has shifted a substantial way toward an essentially vertical longitudinal plane.

Likewise, towards the end of the retracting movement of the roof, there might be interference between the pivoting arms 1, 2 and elements of the vehicle. This can consist of an interference with the boot lid, which is open from front to back, or with the opening through which the roof passes into the boot or even with the walls of the boot. In order to reduce the risks in this area, the device 11 for transmitting the movement limits the pivoting movement of the arms 1, 2 in this area.

For this reason, towards the end of the retracting movement of the roof 3, 4, when the arms 1, 2 are already in their transverse position, the crankpin 12 slides in the low-pivoting area 16 of the slot 14 of member 18, which member 18 has already been described as solidly attached to the rear roof element 3. In this area 16, the movement of the connecting rod 19 in the direction A, relative to the rear roof element 3, is limited. Consequently, the connecting rod 19 transmits a low range of movement to the control tab 17 of the pivoting arm 1 and the range of movement of the arms 1, 2 in this area is limited.

When crankpin 12 is in an intermediate, high-pivoting area of the movement of the roof 3, 4, indicated as area 15 in FIG. 3, the risks of interference between arms 1, 2 while pivoting are reduced; the pivoting range and speed of the pivoting arms 1, 2 can therefore be higher.

For this, in this intermediate area of movement of the roof 3, 4, the crankpin 12 slides in the high-pivoting area 15 of the slot 14 in the member 18 that is solidly joined to the rear roof element 3. Thus, the movement of the connecting rod 19 in the direction A, relative to the rear roof element 3, is maximum. The pivoting range of the arms 1, 2 and therefore the speed, is highest in this area 15.

It should be mentioned that during a roof movement, the crankpin 12 follows a curve 20 with a profile that results from the combination of the relative movements of the guides 13, 14. The low-pivoting areas 16, 16' and the high-pivoting area 15 can be seen in this curve 20.

Other types of interference with the pivoting arms 1, 2 can also be found, mainly with a ceiling. In this case, the pivoting of the arms 1, 2 should be provided before and/or after passing under the ceiling. For this, the shape of the guide 14 solidly joined to the rear element 3 can be adapted.

Evidently, although the operation of the device 11 for transmitting the movement from the roof to the pivoting arms 1, 2 is only explained in detail for the retracting movement of the roof, the transmission of the movement also takes place when extending the roof.

In fact, when extending the roof, the lever arm 7 rotates in anti-clockwise direction around its pivot 8 on the rear roof element 3. This rotation drives the movement of the connecting rod 19 in the direction B, opposite to the direction A, relative to the rear roof element 3.

Thus, at the start of the extending movement of the roof 3, 4, the counterclockwise rotation of the lever arm 7 in relation to its pivot 8 causes the movement of the crankpin 12 in the low-pivoting area 16 of the guide 14 solidly joined to the rear roof element 3. The slot 14 makes it possible thus to limit the movement of the connecting rod 19 in the direction B. Thus, the connecting rod 19 transmits a low range of movement to the control tab 17 of the pivoting arm 1 at the start and end of extending arm 1.

Likewise, at the end of the spreading movement of the roof, the crankpin 12 slides in the slot 13 of the lever arm 7. The slot 13 makes it possible thus to limit the movement of the connecting rod 19 in the direction B. In this way, the connecting rod 19 transmits a low range of movement to the control tab 17 of the pivoting arm 1. The movement of the pivoting arms 1, 2 is thus limited or cancelled out, so that the arms 1, 2 finish their movement in an essentially vertical longitudinal plane.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. A retractable roof for a vehicle comprising at least one front roof element and one rear roof element, these at least two elements being mobile between a covering position in which they cover a passenger compartment of the vehicle and a storage position, the roof also comprising two pivoting arms for supporting the at least one front roof element, and mounted to pivot around axes of rotation on the rear roof element between a longitudinal position in which the arms extend forward from the rear roof element and along the at least one front roof element, and a transverse position, and further comprising a transmission device for transmitting to the pivoting arms, force arising from movement of the rear roof element, said transmission device being arranged to cause rotation of the pivoting arms between their longitudinal and transverse positions while the rear roof element moves between the covering and storage positions thereof.

2. A retractable roof according to claim 1, wherein the transmission device varies the pivoting speed of the arms during the movement of the rear roof element between the covering and storage positions thereof.

3. A retractable roof according to claim 1, wherein the transmission device includes a slot in a member that transmits a relatively low pivoting speed to an arm in at least a first pivoting range of the arm and a relatively high pivoting speed in a second pivoting range of the arm.

4. A retractable roof according to claim 3, wherein the slot in the member transmits the low pivoting speed to the arm during at least one of the start and the end of the movement of the rear roof element.

5. A retractable roof according to claim 1, including at least one lever controlling the movement of the rear roof element and connected for rotation at a first pivot to the body of the vehicle and at a second pivot to the rear roof element, wherein the transmission device comprises a connecting rod connected to the at least one lever near the lever's second pivot on the rear roof element and to a control tab on the arm located near the arm's axis of rotation.

6. A retractable roof according to claim 5, wherein the lever has a slot, and further comprising a crankpin sliding in the lever's slot and connecting the connecting rod to the lever.

7. A retractable roof according to claim 6, wherein the rear roof element has a slot thereon in which the crankpin slides, the curve of which slot modifies the pivoting speed of the arms as a function of the position of the rear roof element during movement thereof between the covering and storage positions.

8. A motor vehicle, including a retractable roof according to claim 1.

* * * * *